United States Patent
Rana et al.

(10) Patent No.: US 9,133,401 B2
(45) Date of Patent: Sep. 15, 2015

(54) CATALYST FOR THE FIRST HYDRODEMETALIZATION STEP IN A HYDROPROCESSING SYSTEM WITH MULTIPLE REACTORS FOR THE IMPROVEMENT OF HEAVY AND EXTRA HEAVY CRUDES

(75) Inventors: Mohan Singh Rana, Del. Gustavo A Madero (MX); Jorge Ancheyta Juárez, Mexico City (MX); Patricia Rayo Mayoral, Mexico City (MX); Samir Kumar Maity, Del. Gustavo A Madero (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 572 days.

(21) Appl. No.: 12/733,054

(22) PCT Filed: May 26, 2008

(86) PCT No.: PCT/MX2008/000064
§ 371 (c)(1),
(2), (4) Date: Mar. 23, 2010

(87) PCT Pub. No.: WO2009/022890
PCT Pub. Date: Feb. 19, 2009

(65) Prior Publication Data
US 2010/0304963 A1    Dec. 2, 2010

(30) Foreign Application Priority Data
Aug. 7, 2007   (MX) .................... MX/a/2007/009504

(51) Int. Cl.
| | | |
|---|---|---|
| *B01J 21/04* | (2006.01) | |
| *B01J 23/652* | (2006.01) | |
| *B01J 23/882* | (2006.01) | |
| *C10G 45/08* | (2006.01) | |
| *B01J 23/56* | (2006.01) | |
| *B01J 23/86* | (2006.01) | |
| *B01J 23/85* | (2006.01) | |
| *B01J 23/887* | (2006.01) | |
| *B01J 35/10* | (2006.01) | |
| *C10G 47/00* | (2006.01) | |
| *C10G 65/04* | (2006.01) | |
| *C10G 65/12* | (2006.01) | |

(52) U.S. Cl.
CPC ............... *C10G 45/08* (2013.01); *B01J 21/04* (2013.01); *B01J 23/56* (2013.01); *B01J 23/652* (2013.01); *B01J 23/85* (2013.01); *B01J 23/862* (2013.01); *B01J 23/864* (2013.01); *B01J 23/866* (2013.01); *B01J 23/882* (2013.01); *B01J 23/887* (2013.01); *B01J 35/1038* (2013.01); *B01J 35/1042* (2013.01); *B01J 35/1061* (2013.01); *C10G 47/00* (2013.01); *C10G 65/04* (2013.01); *C10G 65/12* (2013.01); *C10G 2300/107* (2013.01); *C10G 2300/1077* (2013.01); *C10G 2300/202* (2013.01); *C10G 2300/205* (2013.01)

(58) Field of Classification Search
USPC .......... 502/219, 222, 314, 323, 325, 332, 335, 502/336, 355
See application file for complete search history.

(56) References Cited

U.S. PATENT DOCUMENTS

| | | | | |
|---|---|---|---|---|
| 2,922,767 | A | * | 1/1960 | Koch, Jr. ..................... 502/334 |
| 4,036,784 | A | * | 7/1977 | Gembicki et al. ............ 502/314 |
| 4,089,774 | A | * | 5/1978 | Oleck et al. .................... 208/89 |
| 4,225,421 | A | | 9/1980 | Hensley, Jr. et al. |
| 4,267,071 | A | * | 5/1981 | Jaffe ............................ 502/220 |
| 4,271,042 | A | * | 6/1981 | Oleck et al. .................. 502/314 |
| 4,278,566 | A | * | 7/1981 | Hensley et al. .............. 502/220 |
| 4,306,965 | A | * | 12/1981 | Hensley et al. ......... 208/216 PP |
| 4,328,127 | A | * | 5/1982 | Angevine et al. ............. 502/219 |
| 4,391,740 | A | * | 7/1983 | Gibson ........................ 502/305 |
| 4,411,824 | A | * | 10/1983 | Chen ............................ 502/323 |
| 4,440,956 | A | * | 4/1984 | Couvillion ................... 585/260 |
| 4,456,701 | A | * | 6/1984 | Chen ............................ 502/221 |
| 4,493,906 | A | * | 1/1985 | Couvillion ................... 502/346 |
| 4,687,757 | A | | 8/1987 | Parrott et al. |
| 4,746,419 | A | | 5/1988 | Peck et al. |
| 4,791,090 | A | * | 12/1988 | Pereira et al. ................. 502/263 |

(Continued)

FOREIGN PATENT DOCUMENTS

WO   02/053286    7/2002

OTHER PUBLICATIONS

Rana et al., Hydrotreating of Maya Crude Oil: I. Effect of Support Composition and Its Pore-diameter on Asphaltene Conversion, Petroleum Science and Technology, 25:187-199, 2007.

(Continued)

*Primary Examiner* — Elizabeth Wood
(74) *Attorney, Agent, or Firm* — Roylance, Abrams, Berdo & Goodman, L.L.P.

(57) ABSTRACT

An improved catalyst for hydrodemetallization of heavy crude oils and residua is disclosed. The catalyst is adopted for fixed bed hydroprocessing units. The invention is characterized for having a large pore diameter catalyst principally for hydrodemetallization of heavy oil and residue in a first reactor of a multi-reactor process. The catalyst has high demetallizing activity and high metal deposition capacity which results in good stability with time on stream (TOS). The hydrorefining catalyst is obtained by kneading a porous starting powder principally composed of gamma-alumina and having a pore capacity of 0.3-0.6 ml/g or larger and a mean pore diameter of 10 to 26 nm, extrudating and calcining, and after that supported with active metals component of elements belonging to groups VIIIB and VIB of the periodic table.

8 Claims, 8 Drawing Sheets

(56) References Cited

U.S. PATENT DOCUMENTS

| | | | |
|---|---|---|---|
| 4,908,344 A * | 3/1990 | Pereira et al. | 502/313 |
| 5,177,047 A * | 1/1993 | Threlkel | 502/200 |
| 5,215,955 A * | 6/1993 | Threlkel | 502/221 |
| 5,545,419 A | 8/1996 | Brady et al. | |
| 5,620,592 A * | 4/1997 | Threlkel | 208/216 PP |
| 5,654,254 A * | 8/1997 | Wu et al. | 502/334 |
| 6,218,333 B1 | 4/2001 | Gabrielov et al. | |
| 6,251,261 B1 * | 6/2001 | Kasztelan et al. | 208/111.1 |
| 6,809,061 B2 * | 10/2004 | Bogdan et al. | 502/227 |
| 6,902,664 B2 | 6/2005 | Timken | |
| 7,968,069 B2 | 6/2011 | Rayo Mayoral et al. | |
| 2007/0209968 A1 | 9/2007 | Euzen | |

OTHER PUBLICATIONS

Rana et al., Effect of alumina preparation on hydrodemetallization and hydrodesulfurization of Maya crude, Catalysis Today 98 (2004) 151-160.

Ancheyta et al., Hydroprocessing of Maya heavy crude oil in two reaction stages, Applied Catalysis A: General 233 (2002) 159-170.

* cited by examiner

CATALYST FOR THE FIRST HYDRODEMETALIZATION STEP IN A HYDROPROCESSING SYSTEM WITH MULTIPLE REACTORS FOR THE IMPROVEMENT OF HEAVY AND EXTRA HEAVY CRUDES

FIELD OF THE INVENTION

The present invention relates to a catalyst developed for hydroprocessing of heavy oil and residue, and particularly relates to a catalyst used in a hydrodemetallization step of a multistage process for hydroconversion of heavy crude oils and residue.

The catalysts synthesized by the process of the present invention considerably improve the hydrodemetallization activity and are not deactivated quickly by contaminants, particularly metals such as nickel and vanadium (Ni or and V), that are present in heavy crude oil feedstock. The present process not only removes the adverse impurities such as metals, sulfur, nitrogen, etc, but also can crack heavy fractions into high value components having a low boiling point.

BACKGROUND OF THE INVENTION

Heavy crude oil contains a substantial proportion of asphaltenes and other hydrocarbons which are associated with large amounts of sulfur, nitrogen and metals. In past times, these heavy fractions were usually found to be applicable in paving materials and converted to valuable product using thermal processes. Today, due to the cost and enormous demands for petroleum, these fractions require processing to form more valuable products, which are relatively low in sulfur and lower boiling hydrocarbons that can be used as clean fuels. It is known in the art that this reduction in metal, sulfur and conversion to lower boiling hydrocarbons can be carried out with hydrogen and a solid catalyst at elevated temperatures and pressure. Prior catalysts are very different from the catalyst of the present invention.

WO 0,253,286 claims a hydroprocessing catalyst for the conversion of the heavy oil hydrocarbons, which contains a transition metal of group VI in a concentration of 7 to 20 weight % and a metal of group VIII in a concentration of 0.5-6 weight % in a calcined catalyst, which correspond to oxide composition over a support of alumina. Also claimed is a process for the hydroprocessing of heavy hydrocarbon feedstock with the catalyst of the invention in fixed or ebullated bed.

U.S. Pat. No. 4,225,421 discloses a process for hydrodemetallation and hydrodesulfurization of hydrocarbon feedstocks containing asphaltenes and metals by contacting the feedstock with hydrogen and a bimodal catalyst consisting essentially of a Group VIB hydrogenation metal on a support comprising alumina wherein said catalyst has a surface area of about 140-300 $m^2/g$ and a total pore volume of about 0.4-1.0 cc/g. Out of that total pore volume, 0.06-0.3 cc/g can be pores having a radius greater than 60 nm. U.S. Pat. No. 4,746,419 discloses a bimodal catalyst characterized by a surface area of 75-400 $m^2/g$ and a total pore volume of 0.5-1.5 cc/g. Out of that total pore volume, 0.2-0.3 cc/g are in pores greater than 60 nm radius and not more than 0.15 cc/g in pores greater than 200 nm radius. U.S. Pat. Nos. 4,225,421 and 4,746,419 disclose that high surface area, bimodal catalysts are desirable for hydroprocessing heavy hydrocarbon feedstocks. These patents fail to disclose an understanding that the manner in which the pore volume is distributed throughout the range of pores that are less than 60 nm radius can make a difference in catalyst performance.

U.S. Pat. No. 5,545,602 claims a catalyst with a composition containing very high amount of group VIII and group VIB metals along with phosphorus oxide, with a surface area of 150-240 $m^2/g$, total pore volume of 0.7-0.98 $cm^3/g$, and a pore volume distribution where less than 20% corresponds to the micro-pore zone with diameter of 10 nm, about 34-74% corresponds to pores within a 10-20 nm interval, from 26-46% corresponds to the region of meso-pores with pore diameter of 20 nm, 22-32% with pore diameters of 25 nm, and the macro-pore region with diameters of 100 nm contributes with 14-22%. This patent mainly claims the process for residua feedstock having 4-6° API gravity.

U.S. Pat. No. 6,218,333 discloses a detailed method for the preparation of a catalyst by means of a porous support (alumina, silica-alumina, silica, titanium, boron, zeolites, zirconium, magnesium and their combinations) with one or more active metals (Mo, W, Co, Ni and their oxides, sulfides and mixtures of them). The object of this patent is to find out the proper method of activation before catalytic activities.

U.S. Pat. No. 4,687,757 claims an alumina support which can contain compounds of transition metals titanium and one of molybdenum having a surface area in the 100-250 $m^2/g$ interval, while they are neither claiming the interval of pore volume nor the average pore diameter, both of which are very important properties particularly when the hydrotreating feedstock are residues and/or heavy crude oils. In the detailed description of the patent they reveal a volume of pore of 0.2-2.0 $cm^3/g$, which was determined in mercury penetration equipment. From these data it is evident that the catalyst of the referred patent is used mainly in the hydrodemetallization stage, which contains titania in the support.

On the other hand, the present invention balances catalyst textural properties to provide a catalyst that admits a maximum amount of treatable hydrocarbons into the pores of the catalyst, while at the same time providing access to a maximum number of active catalytic sites on the surface as well as inside the pores without diffusion limitations.

In addition, the present invention involves a catalyst providing higher conversion of heavy hydrocarbon feedstocks along with sufficient stability with time on stream. Thus, the present catalyst is economically attractive since it maximizes the balance of catalyst life and activity of hydroprocessing. The present catalyst is provided by variation of the support composition (different alumina) or different pore diameter of the catalyst.

The above representative patents disclose catalyst formulations and other useful catalyst components along with their process conditions. All of them are with alumina catalysts.

SUMMARY OF THE INVENTION

The performance of heavy oil hydroprocessing catalysts is often affected by pore diffusion limitations generated due to the carbon and metal deposition. The variation of support composition is a way to find out the optimum pore diameter of the catalyst. The reason behind the optimum pore diameter is to obtain more selective activity, which depends on the active metal dispersion as well as pore diameter of the catalysts. However, heavy oils fraction contains high amounts of sulfur and other contaminants that exhibit different reactivity during hydroprocessing, and depending on their complexity, can affect the course of reactions differently; to the point that they can even deactivate the catalyst at a very fast rate. Therefore, before hydroprocessing heavy oil, there are two main concerns that need to be considered: i) environmental specification, and ii) product selectivity. The later case involves the different functionalities of the hydrotreating catalyst, i.e., hydrogenolysis, hydrogenation and hydrocracking, which have an impact on the final product quality depending on both feed and catalyst compositions. Thus, to satisfy both concerns, upgrading of heavy oil is mandatory. Alternatively, refiners are facing a dilemma in trying to keep oil prices more or less steady in spite of treating the crude with more expensive processing methods.

To solve the aforesaid problems existing in the prior art, an object of the present invention is to provide a catalyst for hydroconvertion of a heavy hydrocarbon feedstock.

Another object of the present invention is to obtain a catalyst that has a high metal retention capacity during the operation of heavy oil and residues, thereby prolonging the operation lifetime of the hydroprocessing units as well as protect subsequent process catalysts in a multi-reactor system.

An additional object of the present invention is to develop an HDM catalyst located in the front reactor; to remove metals; and to protect high activity downstream HDS, hydrogenation, and HDN catalysts, which are loaded in subsequent reactors of a multi reactor system.

Therefore, the design of pore structure of catalysts should handle complex metal compounds of large molecular size. In general the HDM catalyst (first reactor) is designed with high porosity and low surface area, while the subsequent catalysts are characterized by higher surface area and moderate pore size distribution. Apart from this, the large pore catalysts enhance diffusion of asphaltene into the interior surface of the catalyst.

The catalyst of the present invention comprises a gamma alumina-supported catalyst for hydrodemetallization of heavy crudes, which comprises an extruded, peptized, calcined boehmite mixture of different boehmites having on its surface a catalytically effective amount of a Group VIB metal and a Group VIIIB metal, said catalyst having a pore volume of 0.3 to 0.6 cc/g, a surface area of 50-120 $m^2$/g, and average pore diameter of 5-30 nm, which is determined by means of nitrogen adsorption, said alumina support having 99% of its pores having a diameter greater than 2 nm.

The present gamma alumina support is prepared by dry mixing two different dried boehmites in powder form to form a dry boehmite mixture, peptizing the dry boehmite mixture with nitric acid to form a peptized boehmite mixture, forming the peptized mixture into extrudates, and calcining the extrudates to form a gamma alumina support.

According to one embodiment of the present invention, the catalyst has a surface area of 120 $m^2$/g, pore volume of 0.36 mL/g and average pore diameter of 11.8 nm. According to another embodiment the extrudates are calcined at a temperature in the range of 500-550° C.

According to a still further embodiment of the present invention, of a catalyst for hydrodemetallization of feedstock of heavy crudes comprises an alumina support having on its surface a catalytically effective amount of a hydrofining catalyst, in which the alumina support is prepared by mixing two different dried boehmites in powder form to form a boehmite mixture, peptizing said boehmite mixture with nitric acid, forming said peptized mixture into extrudates, and calcining said extrudates to form a gamma support, resulting in a catalyst having a pore volume of about 0.3 to 0.6 Ml/g, a surface area of 50-120 $m^2$/g, an average pore diameter from 5-30 nm, which is determined by means of nitrogen adsorption, said catalyst having 99% of its pores having a diameter greater than 2 nm.

BRIEF DESCRIPTION OF THE DRAWINGS

The manner in which the foregoing and other objects are achieved in accordance with the present invention will be better understood in view of the following detailed description and accompanying drawings, which form a part of this specification, and wherein.

DETAILED DESCRIPTION OF THE INVENTION

The catalyst is adapted for fixed bed hydroprocessing units. The catalyst of the present invention is characterized as having a large pore diameter principally for hydrodemetallization of heavy oil and residue in a first reactor of a multi-reactor process. The catalyst has high demetallizing activity and high metal deposition capacity which results in good stability with time on stream (TOS). The hydrorefining catalyst is obtained by kneading a porous starting powder principally composed of gamma-alumina and having a pore capacity of 0.3-0.6 ml/g or larger and a mean pore diameter of 10 to 26 nm, extrudating and calcining, and after that supported with active metals component of elements belonging to groups VIIIB and VIB of the periodic table.

Our invention is intitled "Catalyst for a first-step hydrodemetallization in a multi-reactor hydroprocessing system for upgrading of heavy and extra-heavy crude oils" for improved textural properties of catalysts and their evaluation, the step wise drawing shows the detail preparation method of catalyst.

Stepwise Description of Supports and Catalysts Preparation

Figure 1:
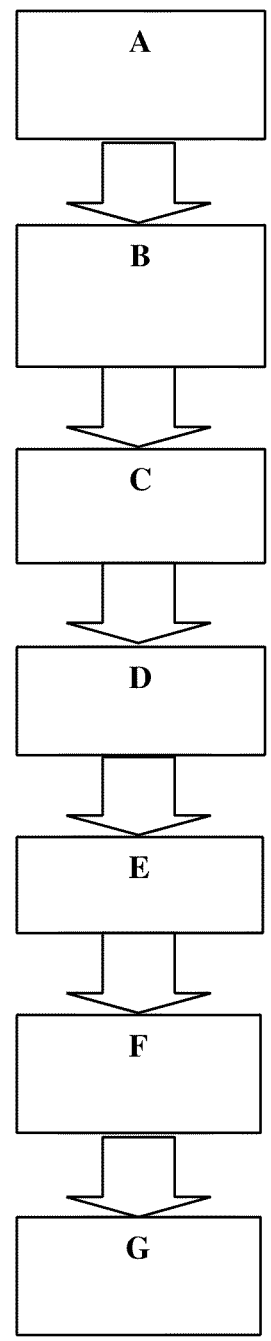
FIG. 1 is a flow diagram showing the steps (A-G) for manufacturing a hydroprocessing catalyst of the present invention, in which (A) refers to the drying of boehmites, (B) is the mixing of boehmite powder, (C) is the peptization of boehmite with $HNO_3$, (D) is the preparation of extrudates, (E) is the drying and calcination of the support, (F) is catalyst preparation, and (G) corresponds to the drying and calcination of the catalysts.

The preparation of support and catalysts are depicted in FIG. 1, which is completed in steps A-G. The principal step is the peptization of aluminas that is responsible for the strength of catalysts as well as generation of macropores due to the inter-particle distance. Boehmite aqueous suspensions were acidified (peptized) with diluted nitric acid at room temperature to produce colloidal sol systems.

The required quantity of aluminum oxyhydroxide (boehmite) is first dried at 120° C. for 5 h (A). The following steps are dry mixing of different boehmites (B), and mixing continuously with 3.5% (volume/volume) of $HNO_3$ and distilled $H_2O$ (C). The mixture is then added to the mixer slowly with continuous mixing with the amount of deionized water necessary to obtain an homogeneous paste adequate to be extruded (D). The extrudates obtained with the paste are maintained at 20-25° C. for 12-18 h, and then they are dried at 100-120° C. for 2-6 h, and calcined at 500-600° C. for 3-5 h, using a heating ramp of 2° C./min to obtain gamma alumina (E). The calcined support was impregnated with the active metal in a sequential impregnation method (F) using a typical group IV metal in the first step and group VIIIB as promoters were used in a second step. The catalysts were dried at room temperature, 120° C. for 12 h, and finally calcined at 450° C. for 4 hours (G). The catalysts prepared with this method with variation of support composition and their physico-chemical properties are those presented in Table 1.

Stepwise Description of Catalyst Pretreatment and Catalytic Test

Figure 2:
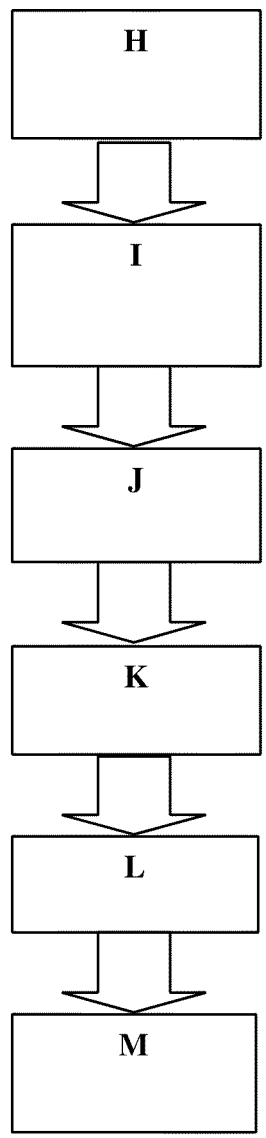
FIG. 2 is a flow diagram showing the steps (H-M) for activation or pretreatment of catalysts of the present invention, where: (H) refers to catalyst loading, (I) a hemiticity test of the reactor, (J) a sulfidation procedure, (K) reaction conditions, (L) time-on-stream of the reaction, and (M) corresponds to the analysis of the reaction products.

The reactor was operated in a fixed bed mode using up-flow and down flow modes. FIG. 2 is a schematic representation of the methodology used for the micro and bench scale reaction evaluation of the catalysts described in the examples of the present invention. In step (H), the reactor is loaded with 10 mL of catalyst with 10 mL of inert material (SiC). Stage (I), corresponds to the test of the equipment at a pressure 10% higher than the one used in normal operation in order to detect any leak in the experimental set up. The stage (J) represents the sulfidation of the catalyst, performed with gasoil from the atmospheric distillation of petroleum (SRGO) to which 2 wt % sulfur was added (DMDS+SRGO). The following operating conditions were used for the sulfidation of the catalyst: reaction temperature of 320° C., pressure of 28 Kg/cm$^2$, LHSV of 2.0 h$^{-1}$ and hydrogen/hydrocarbon ratio of 356 m$^3$/m$^3$. The step (K) corresponds to the operation of the catalytic test that is performed by feeding the mixture of oil and hydrogen to the reactor in ascending mode (descending mode for bench scale). The composition and characteristics of feedstocks for micro and bench scales are those presented in Table 2. The feed to the reactor is a 50/50 wt % mixture of heavy crude and hydrodesulfurized diesel. The operating conditions in stage (K) are as follows: temperature of 380° C., pressure of 5.4 MPa, hydrogen/hydrocarbon ratio of 356 m$^3$/m$^3$, and LHSV of 1.0 h$^{-1}$. In stage L the reaction takes place during 120 h and during this time samples of product are taken every 12 h. Finally, in stage (M), analysis of the products from the reactor is performed.

TABLE 1

Properties of catalysts, indicating the various catalysts composition and their physical properties.
Catalysts properties

| | Cat-1 | Cat-2 | Cat-3 |
|---|---|---|---|
| Support composition, wt. % | | | |
| Catapal C1 | 50 | — | — |
| Catapal 200 | 50 | 100 | — |
| Pural SB | — | — | 50 |
| Pural TH 100 | — | — | 50 |
| Catalyst composition, wt. % | | | |
| $MoO_3$ | 10.01 | 9.98 | 9.99 |
| CoO | 2.2 | 2.2 | 2.1 |
| Catalyst physical properties | | | |
| Shape | Cylindrical extrudate | Cylindrical extrudate | Cylindrical extrudate |
| Size, in | 1/16 | 1/16 | 1/16 |
| Density of extrudates, cc/g | 0.86 | 0.91 | 0.93 |
| Crushing strength (grain-to-grain), kg | 4.2 | 3.8 | 3.9 |
| Specific surface area, m$^2$/g | 120 | 56 | 102 |
| Average pore diameter, nm | 11.8 | 26.8 | 21.5 |
| Total pore volume, ml/g | 0.362 | 0.479 | 0.546 |
| % Micro-pore (d < 2 nm) volume, ml/g | 0.81 | 0.62 | 0.53 |
| % Meso-pore (2 ≤ d ≤ 50 nm) volume, ml/g | 42.5 | 33.8 | 29.3 |
| % Macro-pore (d > 50 nm) volume, ml/g | 56.6 | 65.6 | 70.2 |
| Pore volume, cc/g | | | |
| >5 nm | 12.5 | 3.0 | 4.2 |
| 5-10 nm | 34.8 | 2.6 | 10.5 |
| 10-25 nm | 39.2 | 9.1 | 33.9 |
| 25-50 nm | 8.5 | 20.2 | 44.5 |
| 50-100 nm | 4.0 | 37.5 | 5.2 |
| >100 nm | 1.0 | 27.7 | 1.7 |

TABLE 2

Properties of typical heavy hydrocarbon oil

| Properties | Bench-scale-Feed (Heavy crude oil) | Micro-plant Feed (Diluted feedstock) |
|---|---|---|
| Elemental analysis | | |
| C, wt. % | 86.9 | 84.2 |
| H, wt. % | 5.3 | 8.8 |
| N, wt. % | 0.3 | 0.184 |
| S, wt. % | 3.52 | 2.21 |
| Metal, wppm | | |
| Ni | 49.5 | 26.21 |
| V | 273.0 | 124.78 |
| (Ni + V) | 322.5 | 150.99 |
| Ca | 11.26 | 5.0 |
| Mg | 2.04 | 1.01 |
| Na | 44.83 | 21.2 |
| K | 20.25 | 10.2 |
| Fe | 2.16 | 1.02 |
| Asphaltene, wt. % (n-$C_7$ insol.) | 12.7 | 8.43 |
| Physical properties | | |
| Density, 20/4° C. | 0.9251 | 0.88 |
| Pour point, ° C. | −30 | −15 |
| Ramscarbon, wt. % | 10.87 | 5.45 |
| API gravity | 21.31 | 37.09 |
| Viscosity, g/cm s | | |
| at 50° C. | | 3.08 |
| at 100° C. | | 9.45 |

The selected conditions for the evaluation of catalysts at micro plant and bench scale are those presented in Table 3. At bench scale level the operating conditions for evaluation of the catalysts are more severe than at micro-plant level, the run time was increased to 1000 h and the amounts of catalyst and inert material were 100 and 50 mL respectively.

TABLE 3

Reactor specifications and reaction conditions for fixed-bed integral reactors

| Conditions | Micro-plant | Bench scale plant |
|---|---|---|
| Reactor Specification | | |
| Reactor Length, in | 22.2 | 55 |
| Reactor inner diameter, in | 0.51 | 1.0 |
| Reactor outer diameter, in | 0.98 | 1.5 |
| Reactor material (inox) | SS-316 | SS-316 |
| Reaction Conditions | | |
| Temperature, °C. | 380 | 400 |
| Pressure, MPa | 5.4 | 7.0 |
| Hydrogen flow, l/h | 4.6 | 90 |
| Flow of heavy crude, mL/h | 10 | 100 |
| LHSV, $h^{-1}$ | 1.0 | 1.0 |
| Hydrogen/Oil ratio, $m^3/m^3$ | 356 | 891.0 |
| Mode of operation | Up-flow | Down flow |
| Time-on-stream, h | 120 | 200 |
| Catalyst volume, mL (g) | 10 (8.5) | 100 (85.0) |
| Extrudate diameter, mm | 2.5 | 2.5 |
| Extrudate length, mm | 5-7 | 5-7 |
| Feed composition tested | | |
| Pure heavy crude | — | ✓ |
| Diluted feedstock | ✓ | — |

EXAMPLES

The following examples are provided to illustrate the behavior of the catalyst of the present invention and its use in hydroprocessing of heavy crude oil and residua. These examples should not be considered as limitations of the invention, but should merely teach how to make the appropriate support, catalyst and their evaluation, reflecting the present invention. The reactor had a fixed bed of a particulate supported transitions metal hydroprocessing catalyst. The reactor was run at a total pressure of 5.4-7 MPa. The liquid weight throughput based on catalyst volume was 1 $h^{-1}$, and the hydrogen throughput was equivalent to 891 $m^3/m^3$.

Example 1

A support hydroprocessing catalyst containing the reference aluminas from Table 1 was prepared by the following procedure. The dried 50 parts of catapal C1 alumina (Catapal C1 from Condea) and 50 parts pseudoboehmite alumina (Catapal 200 from Condea) were well mixed in equal proportion considering 25% moisture in both samples. To the mix, diluted $HNO_3$ acid and sufficient amount of de-ionized water were added to form an extrudable paste (3-5 wt % $HNO_3$ to the total powders). These weights are on 100% solids basis. The paste was extruded in 1/16" cylinder, and dried at 100-120° C. overnight. The dried extrudates were calcined at 500-550° C. for 4 hours with purging of excess dry air to obtain a gamma alumina support, and cooled down to room temperature.

Impregnation of Co and Mo was done using a solution containing ammonium heptamolybdate and cobalt nitrate to the target metal loadings of 2.2 wt % CoO and 10 wt % $MoO_3$ in the finished catalyst. The total volume of the solution matched the 100% water pore volume of the base extrudate sample (incipient wetness method). The metal solution was added to the support extrudates gradually while tumbling the extrudates. When the solution addition was complete, the soaked extrudates were aged overnight. Then the extrudates were dried at 120° C. for 12 h. The dried extrudates were calcined at 450° C. for 4 hours with purging excess dry air, and cooled down to room temperature. This catalyst is designated Catalyst 1 (Cat-1) and its physical properties are summarized in Table 1 where it is observed that catalyst contains mesoporous material.

Figure 3:
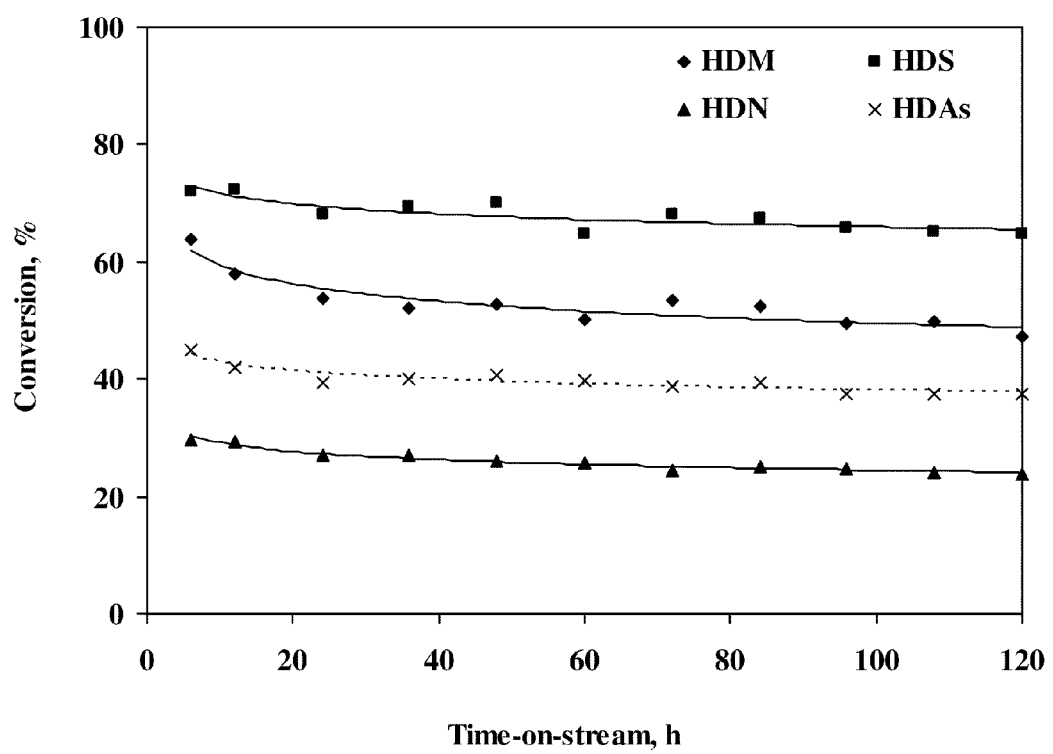
FIG. 3 shows the heavy crude oil hydroprocessing activities for a typical CoMo/$Al_2O_3$ (CoMo/Catapal C1 & Catapal 200) supported catalyst of the present invention with a mixed feedstock of Maya and diesel up to 120 h time-on-stream (Catalyst 1, 11.8 nm).

The catalyst of the present invention was loaded to a reactor and used as first-stage hydrodemetallization catalyst. The run was carried out in a bench-scale test unit having automatic controls for pressure, flow of reactants, and temperature. The reactor specifications are reported in the Table 3. During the reaction the reactor temperatures were controlled at different reactor heights through outside as well as inside thermo-well extended up through the center of the reactor. The hydrocarbon feedstock was fed to the unit by means of a LDC pump, a positive-displacement pump. The activity products of the run were obtained from the product receiver and were analyzed for relevant analysis. Catalyst activities for HDS, HDN, HDM and HDAs are shown in FIG. 3. These activities were slightly decreased with time-on-stream almost at similar magnitude. as shown in FIG. 3.

Example 2

Catalyst 2, a CoMo catalyst containing alumina of the invention, was prepared using a procedure similar to Catalyst 1. For Catalyst 2, catapal 200 alumina of the invention from Example 1 was used to prepare the base extrudates. This catalyst is named Catalyst 2 (Cat-2) and its physical properties are summarized in Table 1. The texturales property of the catalyst (Cat-2) is shown in Table 1 where it is observed that catalyst contains mesoporous material.

Figure 4:
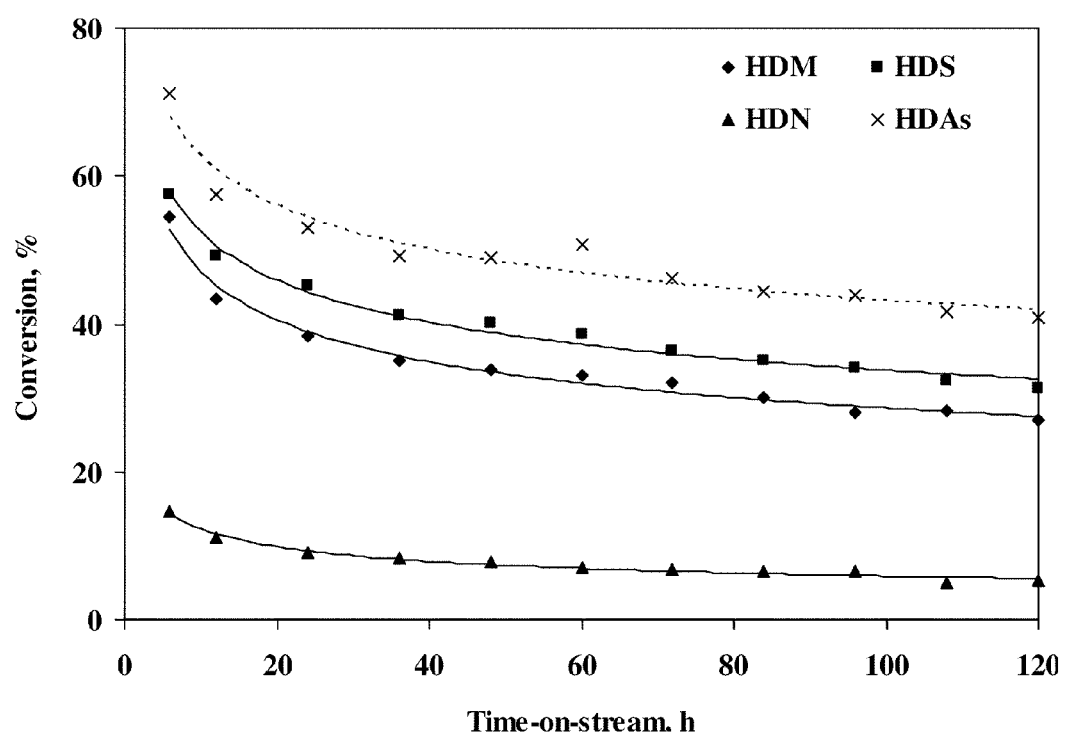
FIG. 4 shows the heavy crude oil hydroprocessing activities for a typical CoMo/$Al_2O_3$ (Catapal 200) supported catalyst invention with a diluted feedstock up to 120 h time-on-stream (Catalyst 2, 26.8 nm).

Catalyst activities for HDS, HDM and HDAs were slightly higher than HDN. These activities were decreased with time-on-stream almost at similar magnitude as shown in FIG. 4.

Example 3

Catalyst 3, a CoMo catalyst containing alumina of the invention, was prepared using a procedure similar to Catalyst 1. For Catalyst 3, 50 parts alumina (Pural SB, from Condea) of the invention from example 1 and 50 parts pural TH alumina (Pural TH 100, from Sasol) were used to prepare the base extrudates. This catalyst is designated Catalyst 3 (Cat-3) and its physical properties are summarized in Table 1. The textural properties of the catalyst (Cat-2) are shown in Table 1 where it is observed that the catalyst contains mesoporous material.

Figure 5:
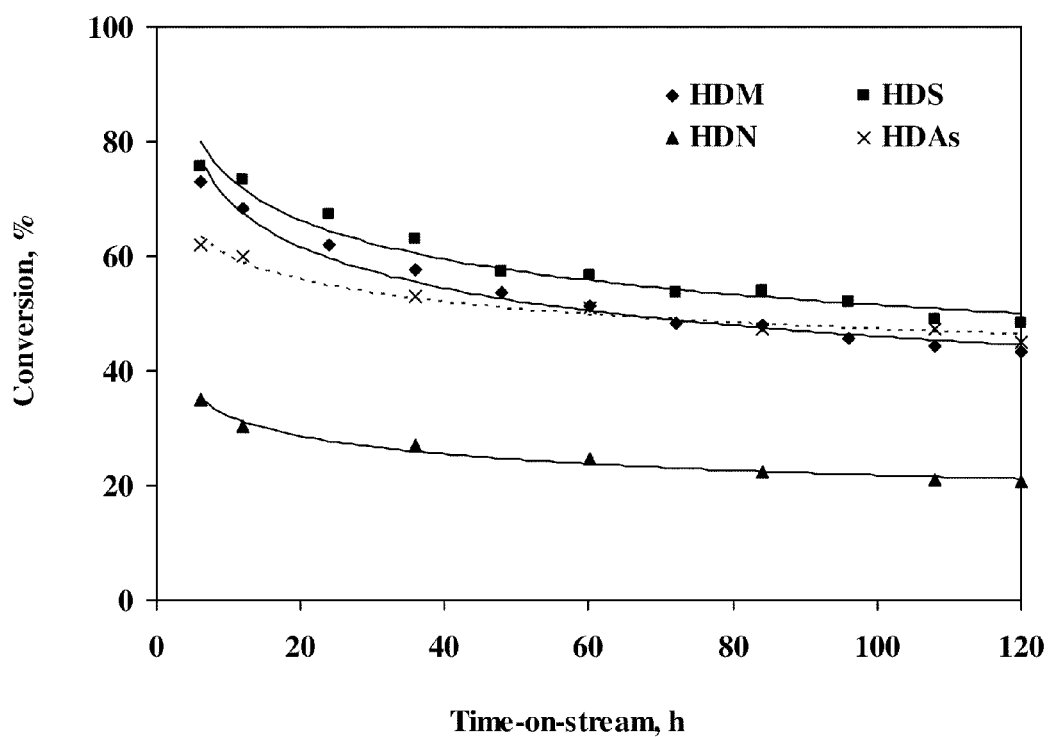
FIG. 5 shows the heavy crude oil hydroprocessing activities for a typical CoMo/$Al_2O_3$ (Pural HT 100 and Pural SB) supported catalyst invention with a mixed feedstock of heavy crude and diesel up to 120 h time-on-stream (Catalyst 3, 21.5 nm).

The catalyst showed almost similar activity for HDS, HDM and HDAs. These activities decreased with time-on-stream almost at similar magnitude as shown in FIG. 5.

Example 4

Comparison Between the Three Catalysts

Figure 6:
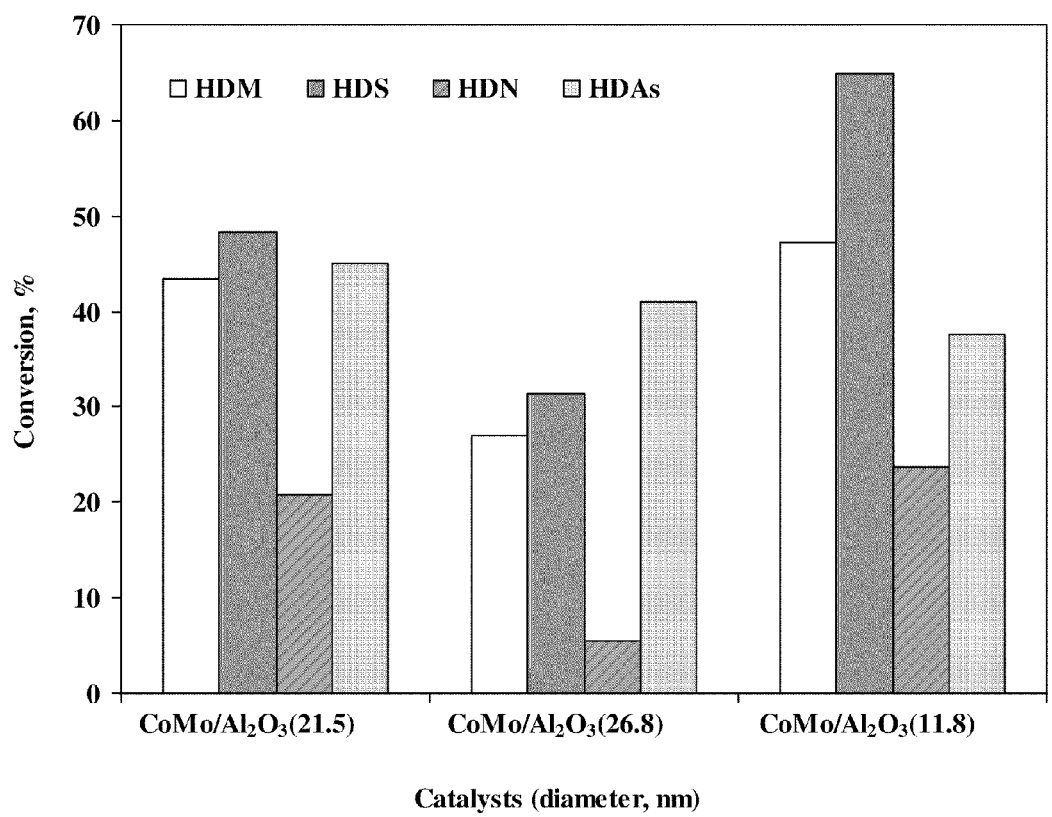
FIG. 6 shows the comparison of performance for three different alumina support compositions for CoMo catalysts of the present invention for hydrodemetallization of heavy crude oil after 120 h TOS.

The catalysts activities were compared for three different catalysts after 120 h time-on-stream as shown in FIG. 6. The activity corresponds to the pore diameter as well as the balance between the pore diameter and dispersion of catalytic sites.

Example 5

Based on the balanced HDS and HDM activities results obtained in the evaluation of catalyst (Cat-1) at micro-plant scale after 120 hours of time-on-stream, this catalyst was evaluated at bench scale during 1000 h of time-on-stream.

The reaction conditions were mentioned previously (Table 3). The behavior of Cat-1 at bench scale is presented in FIG. 7.

The experiment of Example I is repeated with two changes. As base feedstock and a pure Maya crude is used having a sulfur content of 3.52%, a metals content of 322 ppm and a gravity of about 21.3. Results illustrating the effectiveness of the invention similar to those of Example I are observed.

Figure 7:
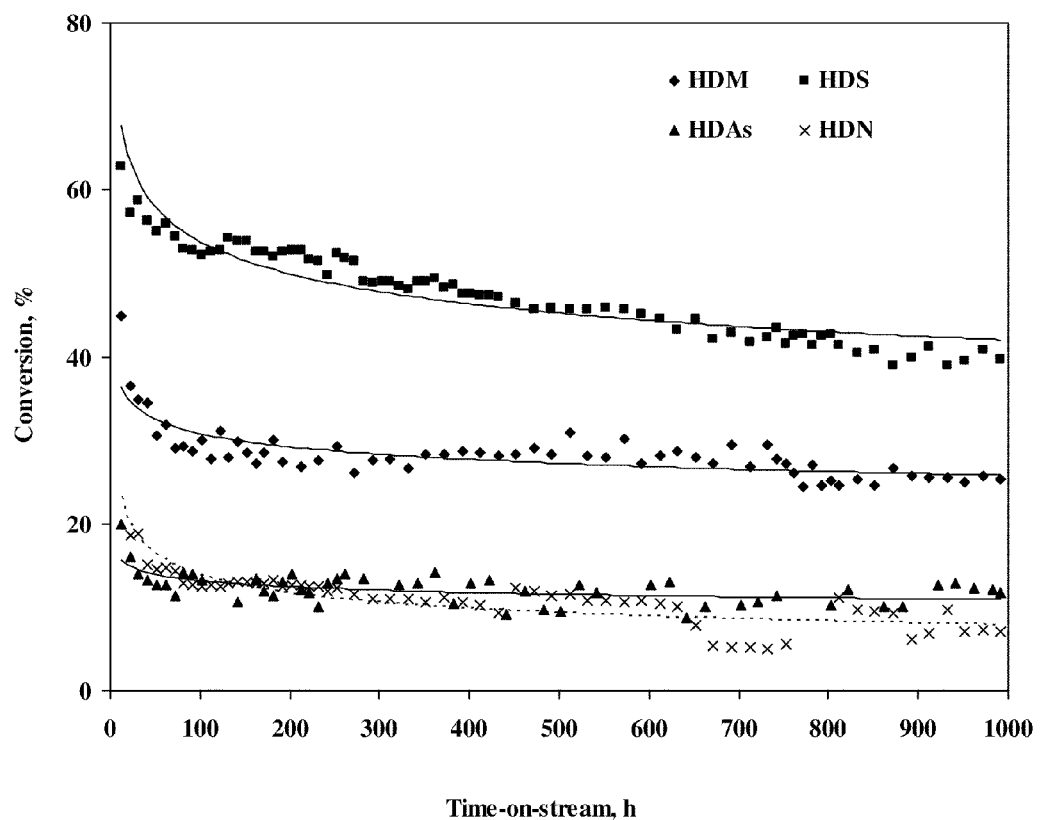
FIG. 7 shows the heavy crude oil hydroprocessing activities for a typical CoMo/$Al_2O_3$ (Catapal C1 and Catapal 200) supported catalyst with a pure Maya heavy crude oil up to 1000 h time-on-stream (Catalyst 1, 11.8 nm).

FIG. 7 shows the results of activity and stability of catalyst (Cat-1) of the present invention evaluated at bench scale. The formulation of Cat-1 exhibited the best activity in the micro plant tests; therefore, it was decided to evaluate this catalyst at bench scale, using a feedstock containing large amount of sulfur, nitrogen and metals. It is observed that catalyst presents constant stable behavior after 100 h and onwards along with time-on-stream of the test, maintaining an HDM conversion level of around 30%. In the same figure the behavior of catalyst (Cat-1) in the HDS (40%), HDN (15%), and HDAs (28%) reactions are also observed. The HDM and HDAs reactions presented the same stability maintaining a conversion of around 30% from 150 h up to 1000 h.

Figure 8:
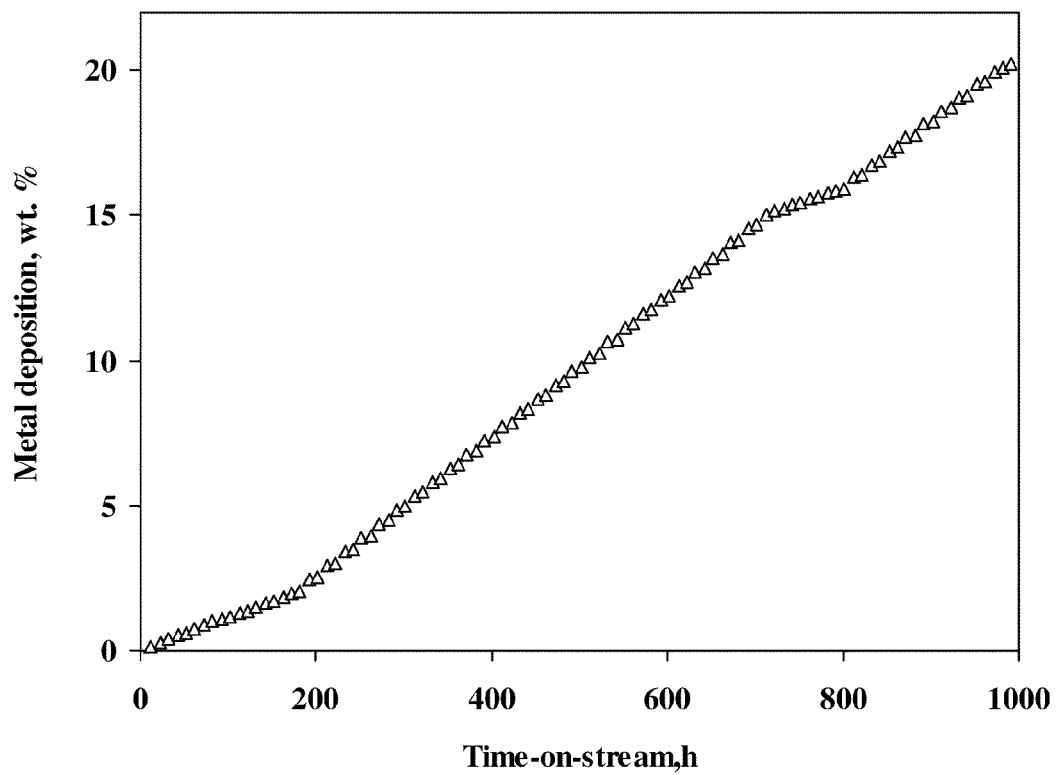
FIG. 8 shows the performance for a CoMo/$Al_2O_3$ (Catapal C1 and Catapal 200) supported catalysts with pure Maya crude up to 1000 h of time-on-stream, showing the metal deposition along with time-on-stream.

Apart from the above conversion the hydrotreated product oil improved API gravity by 6-8 degree along with low metal and sulfur content. Such kind of feedstock can be directly used for hydrocracking or fluid catalytic cracking. During the HDM, catalyst retains Ni and V sulfides as shown in FIG. 8.

We claim:

1. A catalyst for hydrodemetallization of heavy crudes comprising a gamma alumina support formed from two different boehmites having on its surface a catalytically effective amount of a Group VIB metal and a Group VIIIB metal, the catalyst having a pore volume of 0.3 to 0.36 ml/g, a surface area of 50 to 120 $m^2/g$, and average pore diameter from 5 to 11.8 nm, which is determined by means of nitrogen adsorption, the gamma alumina support having 99% of its pores having a diameter greater than 2 nm, the gamma alumina support prepared by dry mixing two different dried boehmites in powder form to form a dry boehmite mixture, peptizing the dry boehmite mixture with nitric acid to form a peptized boehmite mixture, forming the peptized mixture into extrudates, calcining the extrudates to form a gamma alumina support.

2. The catalyst of claim 1 wherein the extrudates are calcined at a temperature in the range of 500-550° C.

3. The catalyst of claim 1, wherein the Group VIB and Group VIIIB metal is in the form of an oxide or sulfide or mixtures thereof.

4. The catalyst of claim 3, wherein said catalyst comprises about 2 to 2.5% by weight cobalt oxide and from about 8 to 12% by weight molybdenum oxide.

5. A catalyst for hydrodemetallization of heavy crudes comprising a gamma alumina support having on its surface a catalytically effective amount of a Group VIB metal and a Group VIIIB metal, said catalyst having a pore volume of 0.36 cc/g, a surface area of 120 $m^2/g$, and average pore diameter of 11.8 nm, which is determined by means of nitrogen adsorption, said alumina support having 99% of its pores having a diameter greater than 2 nm, said alumina support prepared by dry mixing two different dried boehmites in powder form to form a boehmite mixture, peptizing said dry boehmite mixture with nitric acid, forming said peptizing mixture into extrudates, calcining said extrudates to form a gamma alumina support.

6. A gamma alumina-supported catalyst for hydrodemetallization of heavy crudes, which support comprises extruded, peptized, calcined intermixed different boehmites having on its surface a catalytically effective amount of of a Group VIB metal and a Group VIIIB metal, said catalyst having a pore volume of 0.36 mL/g, a surface area of 120 $m^2/g$, and average pore diameter of 11.8 nm, which is determined by means of nitrogen adsorption, said alumina support having 99% of its pores having a diameter greater than 2 nm.

7. The catalyst of claim 6, wherein the Group VIB and Group VIIIB metal is in the form of an oxide or sulfide or mixtures thereof.

8. The catalyst of claim 6, wherein said catalyst comprises about 2 to 2.5% by weight cobalt oxide and from about 8 to 12% by weight molybdenum oxide.

* * * * *